US008412364B2

(12) United States Patent  (10) Patent No.: US 8,412,364 B2
Li et al.  (45) Date of Patent: Apr. 2, 2013

(54) METHOD AND DEVICE FOR SENDING AND PLAYING STREAMING DATA

(75) Inventors: Zhaozao Li, Shenzhen (CN); Hongbo Liu, Shenzhen (CN); Shen Qu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 571 days.

(21) Appl. No.: 12/642,733

(22) Filed: Dec. 18, 2009

(65) Prior Publication Data

US 2010/0168885 A1 Jul. 1, 2010

(30) Foreign Application Priority Data

Dec. 25, 2008 (CN) .......................... 2008 1 0241869

(51) Int. Cl.
*G06F 17/00* (2006.01)
(52) U.S. Cl. .......................................................... 700/94
(58) Field of Classification Search .................... 700/94; 369/1–12; 704/500–504; 381/56, 58, 61
See application file for complete search history.

(56) References Cited

U.S. PATENT DOCUMENTS

2004/0064576 A1* 4/2004 Goldhor et al. ............... 709/232

FOREIGN PATENT DOCUMENTS

| CN | 101043695 A | 9/2007 |
| CN | 101084676 A | 12/2007 |
| WO | WO 2007105618 A2 | 9/2007 |

OTHER PUBLICATIONS

Rejection Decision in corresponding Chinese Patent Application No. 200810241869.X (May 3, 2012).
State Intellectual Property Office of the People'S Republic of China, $2^{nd}$ Office Action in Chinese Application No. 200810241869.X (Dec. 7, 2011).
First Office Action in Chinese Application No. 200810241869.X, mailed May 11, 2010.

* cited by examiner

*Primary Examiner* — Andrew C Flanders
(74) *Attorney, Agent, or Firm* — Leydig, Voit & Mayer, Ltd.

(57) ABSTRACT

A method and a device for sending and playing the streaming data are disclosed in embodiments of the present invention. The method for playing the streaming data includes: receiving the streaming data from the client and buffering the data; and exporting the buffered streaming data according to the predefined rhythm. The statistics about the streaming data in the buffer is collected; and the rhythm is adjusted according to the amount of streaming data. The transmitting end can send the streaming data to the client as soon as possible and buffer only a little data; the client controls the rhythm to reduce the effect of network jitter on delay, thus shortening the delay of streaming play.

12 Claims, 9 Drawing Sheets

METHOD AND DEVICE FOR SENDING AND PLAYING STREAMING DATA

CROSS-REFERENCE TO RELATED APPLICATION

This application claims priority to Chinese Patent Application No. 200810241869.X, filed on Dec. 25, 2008, which is hereby incorporated by reference in its entirety.

FIELD OF THE INVENTION

The prevent invention relates to the multimedia communication technology field, and in particular, to a method and a device for sending and playing the streaming data and a streaming on-demand system.

BACKGROUND

At present, with the development of network technologies, the streaming media are widely used. People can watch live TV programs through a network channel, perform remote monitoring in real time through a network camera, or perform streaming on demand over a network to broadcast the code stream that is stored on the server. In the network streaming applications, people demand smoothness of audio and video and high real-time performance of live broadcast or monitoring applications. Due to the limited network bandwidth, audio and video data transmitted on a network, however, is affected by the network jitter. In this case, the receiving end fails to play video or audio smoothly.

To shield adverse effect of network jitter on audio and video, a data buffer is added at the receiving end of the network. A simple buffer, however, brings a great delay to audio and video on demand. An important issue is how to ensure the smoothness of playing audio and video without delay.

With the prior art, a real-time streaming transmission method is provided. A media server changes the rate of sending data to a playing terminal when the amount of data in the buffer of the playing terminal is abnormal, and restores the rate to a normal sending rate when the amount of data in the buffer of the playing terminal is restored to the normal amount. The data sending rate of the media server varies according to the amount of data in the buffer to ensure that streaming play quality in the case that the network conditions are unsteady.

In the process of implementing the embodiment of the present invention, the inventor, however, discovers that the prior art at least has the following disadvantage: The final output from a media server to a playing terminal enlarges the playing output delay, thus failing to meet the requirements for real-time performance.

SUMMARY

A method and a device for sending and playing the streaming data are provided herein to shorten the delay of streaming play.

A method for sending streaming data comprises: acquiring streaming data and storing the streaming data in a buffer; obtaining the amount of the streaming data stored in the buffer; sending the streaming data to the client according to the amount of the streaming data stored in the buffer, where discarding non-critical data of the streaming data stored in the buffer if the amount of the streaming data stored in the buffer exceeds a first waterline.

A method for playing the streaming data comprises: receiving streaming data from a server and storing the streaming data in a buffer; obtaining the amount of the streaming data in the buffer; adjusting the playing rhythm according to the amount of the streaming data, wherein speeding up the playing rhythm if the amount of streaming data in the buffer exceeds a third waterline T3.

A streaming service device comprises: a first storage unit, configured to acquire streaming data to be sent and store the streaming data; a first statistics-collecting unit, configured to collect statistics about the amount of the streaming data that is stored in the first storage unit; a first dispatching unit, configured to discard the non-critical data of the streaming data stored in the first storage unit when the amount of streaming data stored in the first statistics-collecting unit exceeds a first waterline T1; a sending unit, configured to send the streaming data.

A streaming play device comprises: a second storage unit, configured to buffer streaming data from the server; an output unit, configured to export the streaming data for playing; a second statistics-collecting unit, configured to collect statistics about the amount of the streaming data stored in the second storage unit; a second dispatching unit, configured to adjust playing rhythm of the output unit according to the amount of the streaming data, where the second dispatching unit speeds up the playing rhythm when the amount of the streaming in the second storage unit exceeds a third waterline T3.

BRIEF DESCRIPTION OF THE DRAWINGS

To explicitly explain the technical solution in an embodiment of the present invention or the solution of the prior art, the figures used in the embodiment or the existing technical descriptions are described as follows. Obviously, the following figures are embodiments of the present invention, based on which other figures can be obtained by those skilled in the art without creative work.

DETAILED DESCRIPTION

The following section explicitly describes the complete technical solution provided in the embodiments of the present invention. Obviously, only part of the embodiments of the present invention are provided herein. All the other embodiments obtained by those skilled in the art without creative work based on the embodiments of the present invention fall in the scope of the present invention.

In an embodiment of the present invention, the sending data is controlled on the server or the rhythm is controlled on a client to provide a short-delay streaming on-demand solution against network jitter.

The terms possibly used in an embodiment of the present invention are explained as follows:

playing rhythm: speed of presenting the streaming contents, such as the speed at which video contents are shown;

playing beat: speed of playing streaming data, such as the amount of streaming data that is played per second; that is, the number of video frames or an audio clip that is played per second. The audio clip is the audio data with the fixed length;

sending beat: speed of sending the streaming data, such as the amount of streaming data that is sent per second;

receiving beat: speed of receiving the streaming data, such as the amount of streaming data that is sent per second. The streaming data is transmitted over a network by segments, and therefore, the data needs to be received by segments;

waterline: a value that is preset for the stored amount of data in the buffer. When the amount of data is less than or greater than the waterline, the relevant process is performed;

non-critical data: streaming data that is transmitted over a network is usually compressed data, which is classified into the critical data and non-critical data. The non-critical data is usually acquired by processing critical data. For example, in the compressed video stream, the critical data refers to a reference frame, and the non-critical data refers to a non-reference frame. The reference frame cannot be discarded usually. If the reference frame is discarded, the decoded image has an error. The non-critical data can be discarded. The audio data is also classified into the critical data and non-critical data;

critical data: the explanation of non-critical data; and coarse adjustment: large-scale adjustment; that is, the requirement for smooth control can be relaxed.

Embodiment 1

Method for Sending Streaming Data

Figure 1:
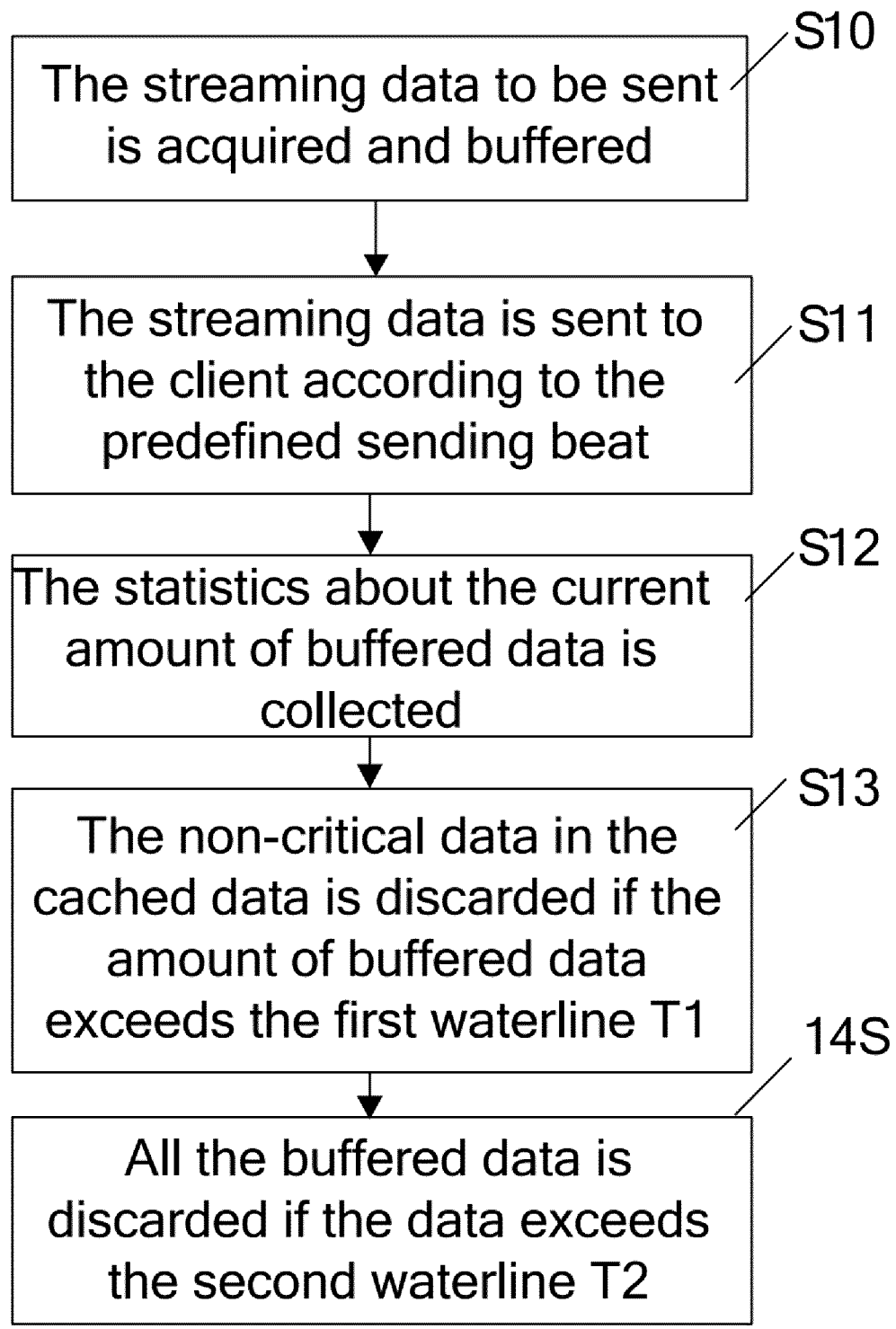
FIG. 1 is a flowchart of a method for sending the streaming data provided in an embodiment 1 of the present invention.

As shown in FIG. 1, the method includes:

S10: The streaming data to be sent is acquired, and the streaming data is buffered.

After receiving an on-demand request from a client, the server acquires the streaming data to be sent from the database or by collecting the media data in real time and then encoding the collected media data.

S11: The streaming data is sent to the client according to the predefined sending beat.

Suppose that the data collected by or acquired from the server is compressed at a fixed beat, and then sent to the buffer. Due to instability of network, the process of sending data needs dispatching. If the network broadband is good and the network transmission is not blocked, the sending beat is set to the beat greater than the fixed beat, so that no data or little data is kept in the buffer.

S12: The statistics about the current amount of the streaming data stored in the buffer are collected.

If the network condition is bad and network transmission is blocked, resulting in that the sending beat is less than second (s for short), the buffered data is accumulated. When the network condition is good and the sending beat is greater than s, the accumulated data is sent quickly.

S13: The non-critical data of the streaming data is discarded if the amount of the streaming data stored in the buffer exceeds a first waterline T1.

If the network condition is bad and cannot be recovered to a good condition for a long time, only the critical data is sent to the playing terminal and the non-critical data is discarded when the accumulated buffered data exceeds the low waterline T1.

S14: All the buffered data is discarded if the amount of the data exceeds a second waterline T2.

Figure 2:
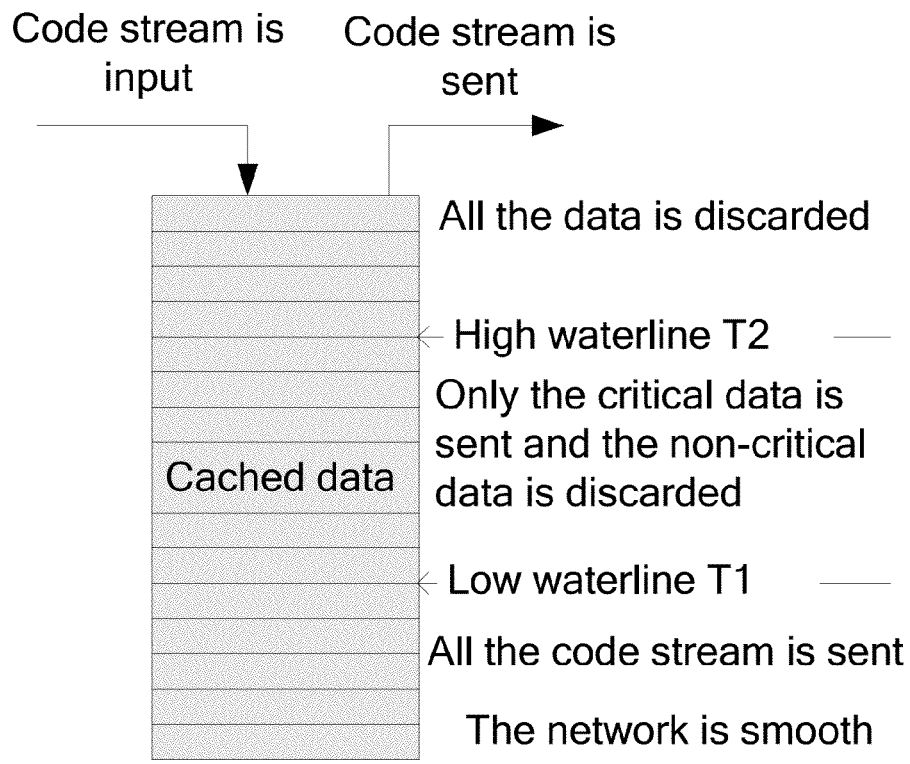
FIG. 2 shows a method for adjusting the sending data according to the amount of buffered data that is provided in an embodiment 1 of the present invention.

If the network condition has been poor for a certain period, resulting in that the data stored in the buffer exceeds a second waterline T2, all the data stored in the buffer is discarded. When the network condition is recovered, the critical data is sent continuously when the data is received, as shown in FIG. 2. The second waterline is a high waterline, that is T2>T1. S14 is not mandatory. In this case, the real-time performance of media on demand can be enhanced to the maximum extent and the delay is shortened.

With the method for sending the streaming data provided in an embodiment of the present invention, the server can send the streaming data as soon as possible when the network conditions are good without buffering the data, and the server needs to buffer the data when the network condition is bad. In this case, the buffer capacity required by the server can be reduced, and the impact of network jitter on the server receiving data is reduced.

Embodiment 2

Method for Playing the Streaming Data

Figure 3:
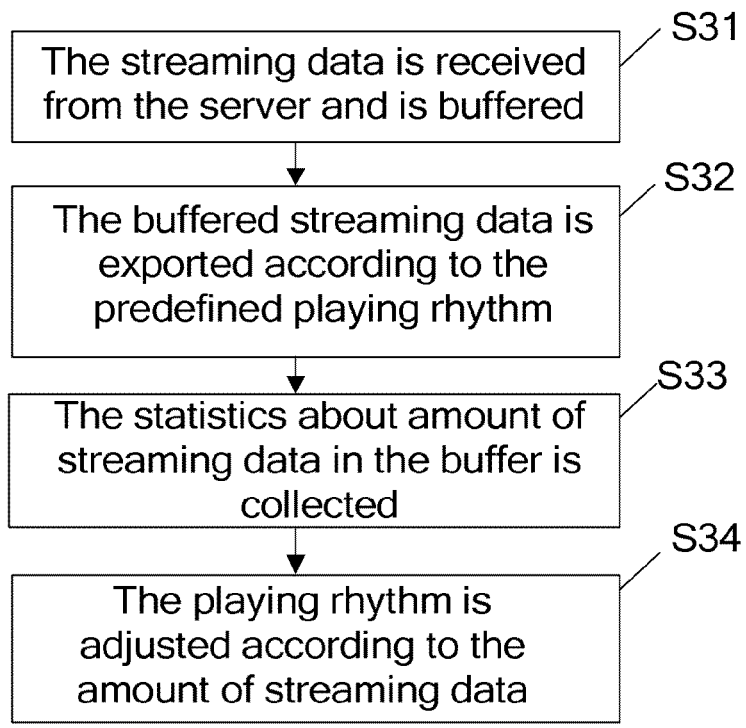
FIG. 3 is a flowchart of a method for playing the streaming data provided in an embodiment 2 of the present invention.

As shown in FIG. 3, a method in accordance with another exemplary embodiment of the present invention includes:

S31: The streaming data is received from a server and the streaming data is buffered.

S32: The streaming data stored in the buffer is exported according to a predefined rhythm.

S33: The statistics about the amount of the streaming data in the buffer are collected. The statistical amount of data can be represented by a unit of streaming data. For video data, the statistics are collected in the unit of frames. For audio data, the statistics are collected in the unit of audio clips.

S34: The playing rhythm is adjusted according to the amount of streaming data.

Specially, S34 includes: If the amount of streaming data in the buffer exceeds a third waterline T3, the playing rhythm is speeded up; if the amount of streaming data in the buffer is less than the third waterline T3, the playing rhythm is slowed down.

Figure 4:
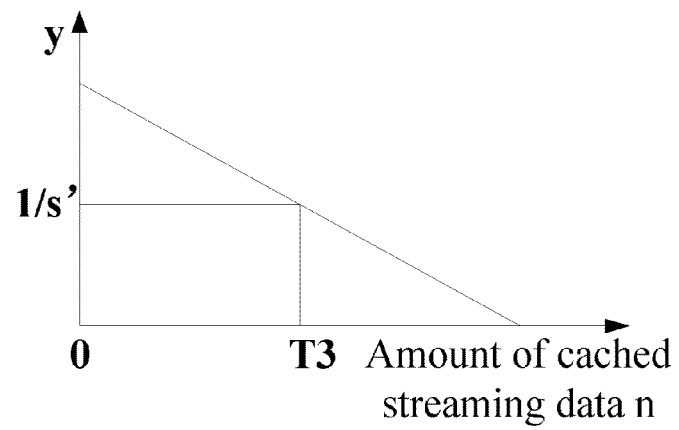
FIG. 4 shows a relationship between the playing beat and the number of buffer frames provided in an embodiment 2 of the present invention.

The playing rhythm can be adjusted smoothly to achieve better play effect. Adjustment for the playing rhythm can be implemented by adjusting playing beat of the streaming data, or discarding the data stored in the buffer, or replaying data that is played. Take video data as an example. The statistics about the amount of streaming data in the buffer are collected in the unit of frames. Suppose that n represents the number of streaming data frames in the buffer, y represents the time interval between adjacent frames that are exported after playing adjustment (1/y represents the playing beat), and s' represents the receiving beat of frame data that is sent by the server over a network, that is, receiving beat. The relationship between y and n is shown in FIG. 4:

When the number of frames stored in the buffer n=T3, y=1/s'. In this case, the playing beat is equal to receiving beat s' of input code stream.

When n>T3, y<1/s', that is 1/y>s'. In this case, the greater the n is, the more greatly the playing beat should speed up.

When n<T3, y>1/s', that is 1/y<s'. In this case, the less the n is, the more slowly the playing beat should become.

In the mode similar to the linear adjustment of playing beat, the amount of data that is left in the buffer is controlled in the level of the remaining T3. Even though network jitter occurs, and the code stream s' that is sent over the network is unstable, resulting in that the data n in the buffer is far away from the waterline T3, the preceding mode can be used to smoothly export the streaming data, such as images and audio, and fast converge the data. That is, when the data in the buffer is far away from the waterline due to an abnormality, the rhythm can be speeded up, so that the data n in the buffer is controlled near the waterline T3 and the rhythm reaches a plateau.

The value of T3 has great impact on playing delay. In the case of smooth playing, that is, if n>0, the value of T3 should be minimized.

The waterline T3 can be adjusted adaptively as follows: If the amount n of buffered streaming data reaches the bottom of buffer for many times in a certain period, that is, n=0 nearly, the height of the waterline 3 is adjusted upwards, that is, the value of T3 is raised. If the bottom of buffer is not reached for a long period, the waterline T3 is adjusted downwards. As shown in formula (1), if the amount of buffered streaming data n is less than TL in the period for playing N1 frames continuously for the times which is greater than N times, the value of T3 is raised; if the amount of buffered streaming data n is always greater than one frame in the period for playing N2 frames continuously, the value of T3 is lowered.

$$T3 = \begin{cases} T_0, & \text{During initialization} \\ T3 + \Delta T3, & n \text{ in the buffer} \leq TL \text{ for } N \\ & \text{times when the } N1 \text{ frame is played} \\ T3 - \Delta T3, & n \text{ in the buffer} > 1 \text{ when the } N2 \\ & \text{frames are played continuously} \end{cases} \quad (1)$$

The following section takes an adjustment of playing beat as an example.

Figure 5:
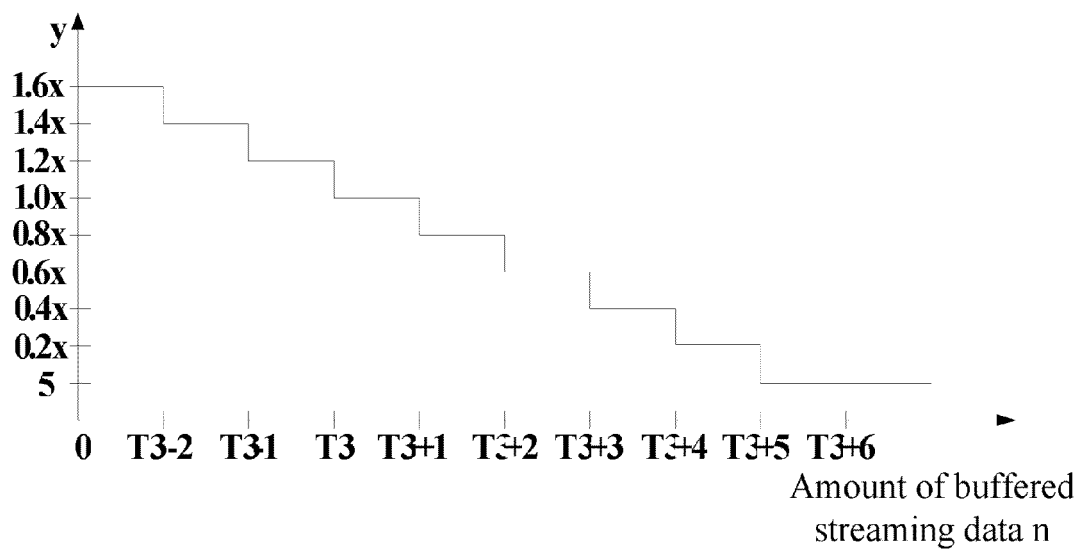
FIG. 5 shows an instance of the relationship between the playing beat and the number of buffer frames provided in an embodiment 2 of the present invention.

FIG. 5 shows a relationship between the playing beat and the number of frames in the buffer, where x represents the time interval between adjacent frames when the streaming data is stored into the buffer (x=1/s'). The input code stream is sent to the buffer at an interval of x. When the number of frames in the buffer is greater than T3, the playing beat speeds up. When the number of frames is less than T3, the playing beat slows down. Therefore, the dispatch of playing beat makes the buffered data controlled near the T3 frame. The adaptive adjustment of T3 is shown in formula (2):

$$\text{Adaptive buffer water line } T3 = \begin{cases} T_0, & \text{uring initialization} \\ T3 + 1, & n \text{ in the buffer} \leq 1 \text{ for two times} \\ & \text{when 30 frames are played} \\ T3 - 1, & n \text{ in the buffer} > 1 \text{ when 300} \\ & \text{frames are played continuously} \end{cases} \quad (2)$$

When the T0 value is an integer greater than 2, the time interval y between two frames that are played actually can be one of the following values:

$$y = \begin{cases} 1.6x, & n \geq T3 - 3 \\ 1.4x, & n = T3 - 2 \\ 1.2x, & n = T3 - 1 \\ x, & n = T3 \\ 0.8x, & n = T3 + 1 \\ 0.6x, & n = T3 + 2 \\ 0.4x, & n = T3 + 3 \\ 0.2x, & n = T3 + 4 \\ 5, & \text{others} \end{cases}$$

Of course, the relationship between y and number of remaining frames in the buffer can be configured randomly, but the following playing beat dispatch mode must be met: The more the number of frames in the buffer, the faster the playing beat, that is, the smaller the time interval between two played frames. The less the number of frames in the buffer, the slower the playing beat, that is, the larger the time interval between two played frames.

Figure 6:
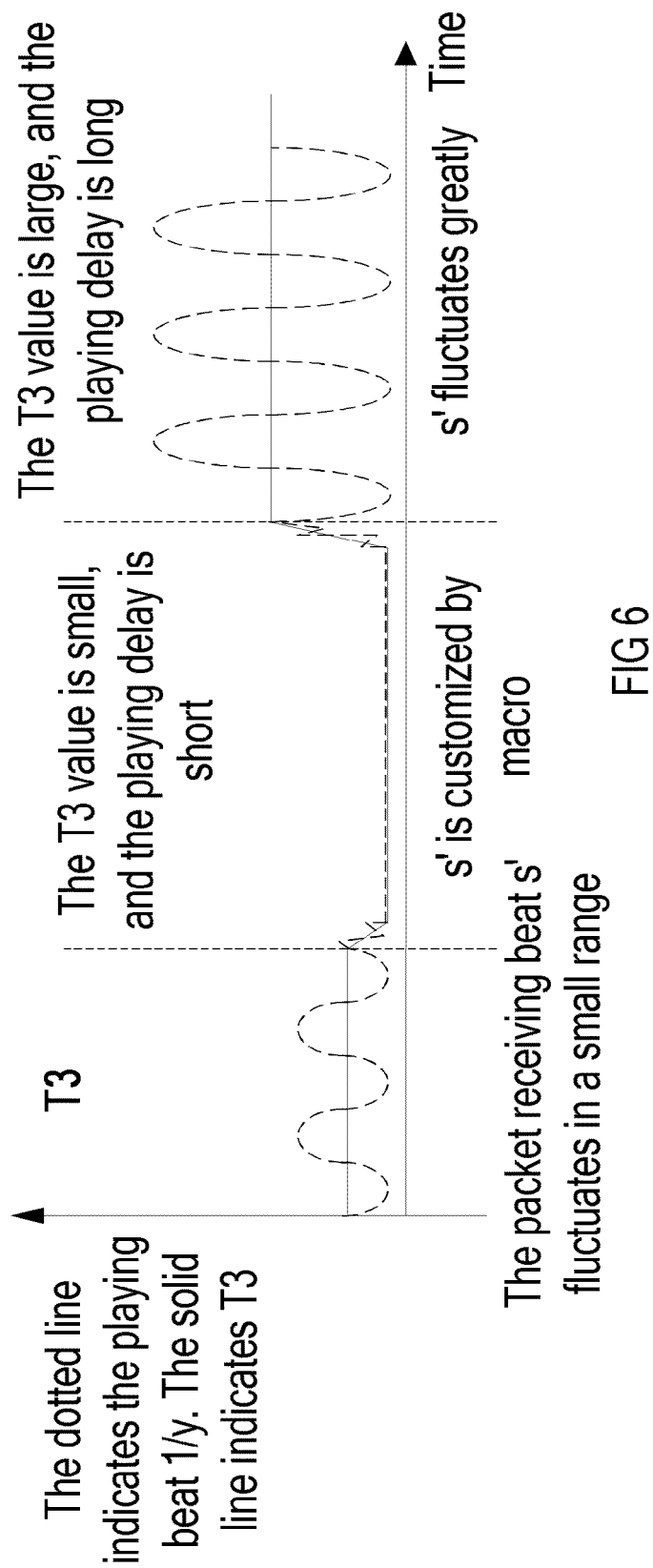
FIG. 6 shows a relationship between a third waterline T3 and the receiving beat provided in an embodiment of the present invention.

FIG. 6 shows a relationship between T3 and the network condition. The solid line indicates the value of T3. The dotted line indicates the playing beat s', that is, 1/y. FIG. 6 shows that when the receiving beat fluctuates in a small range, it indicates that the network jitter is small, T3 is set to a small value, and the playing delay is short; when the receiving beat fluctuates in a large range, it indicates that network jitter is large, T3 is set to a large value, and the playing delay is long; and if the receiving beat location is represented by a stable value, it indicates that the network is not jittered nearly, T3 is set to the minimum value, and the playing delay is the shortest. That is, the values of waterline can be set according to different network conditions to meet various actual application demands. For example, if the network conditions are good, T3 can be set to a small value; if the network condition is bad, T3 can be set to a large value; if perfect real-time performance is required, T3 can be set to a small value; if high streaming play quality is required, T3 can be set to a large value.

With the method for playing the streaming data provided an embodiment of the present invention, the playing delay can be minimized to about 250 ms in the LAN. The waterline value can be adjusted to balance the relationship between delays and play quality. On the basis of ensured short delay, images can be output smoothly, and the waterline can be adjusted according to different network conditions and bandwidth to meet various user demands. In addition, the client can achieve the smooth control of the rhythm easily in real time.

Embodiment 3

Method for Playing the Streaming Data

Some audio and video output beats are fixed, so the rhythm can be adjusted by discarding data or playing data repeatedly instead of adjusting the rhythm. To speed up the rhythm, all the data or non-critical data in a frame in the buffer can be discarded. To slow down the rhythm, the data can be played repeatedly. The waterline is set in the way similar to that in the embodiment 2. The smooth control of the rhythm can be achieved in a mode similar to the linear adjustment mode in embodiment 2. For example, the more the data in the buffer exceeds the waterline T3, the more the non-critical data is discarded. The less the data exceeds the waterline T3, the less the non-critical data is discarded. If the data in the buffer is less than the waterline T3, the rhythm needs to be slowed down. The less the data in the buffer, the more the data is played repeatedly. The more the data in the buffer, the less the data is played repeatedly.

Figure 7:
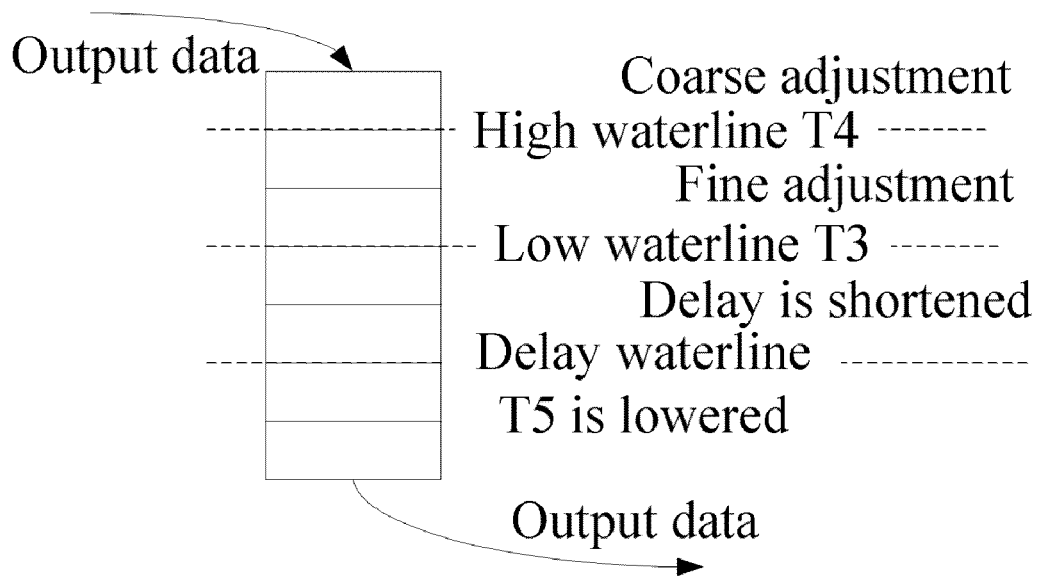
FIG. 7 shows a relationship between the rhythm and the number of buffer frames provided in an embodiment 3 of the present invention.

If the network conditions are good, the receiving beat is always larger than the playing beat, and the data in the buffer exceeds the set waterline T3 greatly. Then, playing delay is prolonged. To ensure the real-time performance of playing data, a high waterline T4 can be set, which is larger than T3, as shown in FIG. 7. When the data in the buffer exceeds T4, the playing rhythm can be adjusted coarsely, that is, adjusted significantly. If the adjustment is performed by adjusting the playing beat, data can be played in a fixed high beat to clear data in the buffer quickly; or, if the rhythm is adjusted by discarding data, data in most of frames or all the frames in the buffer can be discarded. Of course, the waterlines T3 and T4 can be adjusted adaptively to meet the requirements for playing quality and real-time performance at the same time: T3 can be adjusted in the way described in embodiment 2, and T4 is also adjusted similarly. If the number of frames in the buffer exceeds T4 greatly, the value of T4 is lowered; if the number of frames in the buffer exceeds T4 rarely, the value of T4 is raised. In the case of real-time data on demand, the fifth waterline T5 can be set for shortening delay to meet the requirement for high real-time performance. When the amount of streaming data in the buffer exceeds T5 continuously for many times which is larger than the predefined times, such as 1000 times, the remaining data in the current buffer needs to be cleared. T5 is usually less than T3 to better control delay.

The preceding section shows that the waterlines can be adjusted in the following mode provided in an embodiment of the present invention: If the data in the buffer exceeds the low waterline, fine adjustment is performed, for example, by discarding the data in a frame or speeding up the playing beat slightly to prevent the data from increasing; if the data in the buffer exceeds the high waterline, coarse adjustment is performed in the abnormal condition, for example, by clearing the remaining data in frames in the buffer. In this way, the rhythm can be adjusted to a normal tempo in the case of abnormality. To shorten the delay, a waterline can be added for shortening the delay. If the output beat detects that the data in the buffer exceeds the waterline for many times, redundant data is accumulated in the buffer to produce delay. In this case, only data in several frames is left in the buffer.

Those skilled in the art can understand and implement all or part procedures of the methods in the forgoing embodiment. The methods can be achieved by a computer program through guiding related hardware, and the procedures described can be stored in a computer readable storage medium. Therefore, when the program is implemented, it involves the procedures of methods in the forgoing embodiment. By the way, the described storage medium can be a disk, CD, Read-Only Memory (ROM), or Random Access Memory (RAM).

Embodiment 4

Streaming Service Device

Figure 8:
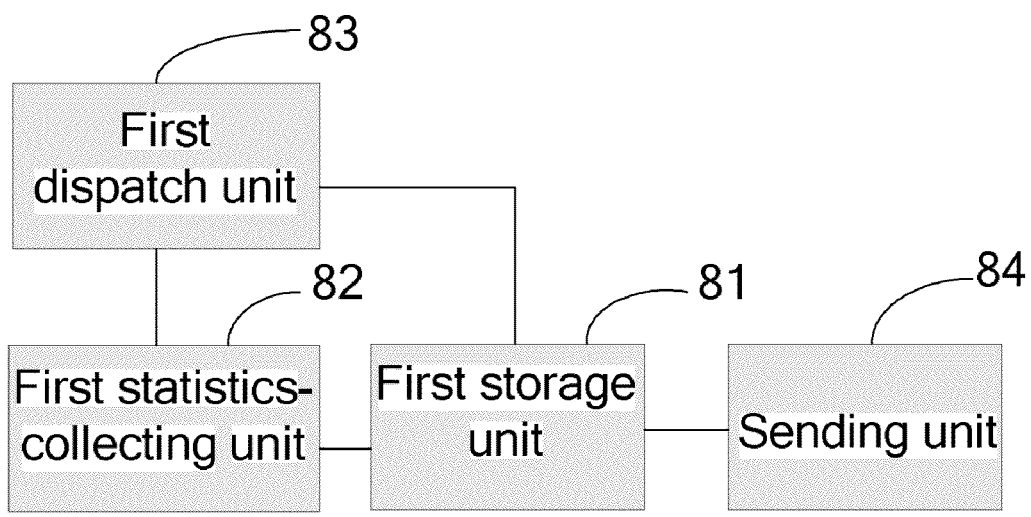
FIG. 8 shows a structure of a streaming service device provided in an embodiment 4 of the present invention.

As shown in FIG. 8, the device includes:
a first storage unit 81, adapted to acquire the streaming data to be sent and store the data;
a first statistics-collecting unit 82, adapted to collect the statistics about the amount of streaming data that is stored by the first storage unit 81;
a first dispatching unit 83, adapted to discard the non-critical data of the streaming data that is stored by the first storage unit 81 when the amount of streaming data whose statistics are collected by the first statistics-collecting unit 82 exceeds the first waterline T1; and
a sending unit 84, adapted to send the streaming data that is stored by the first storage unit 81 to the client according to the predefined sending beat.

Figure 9:
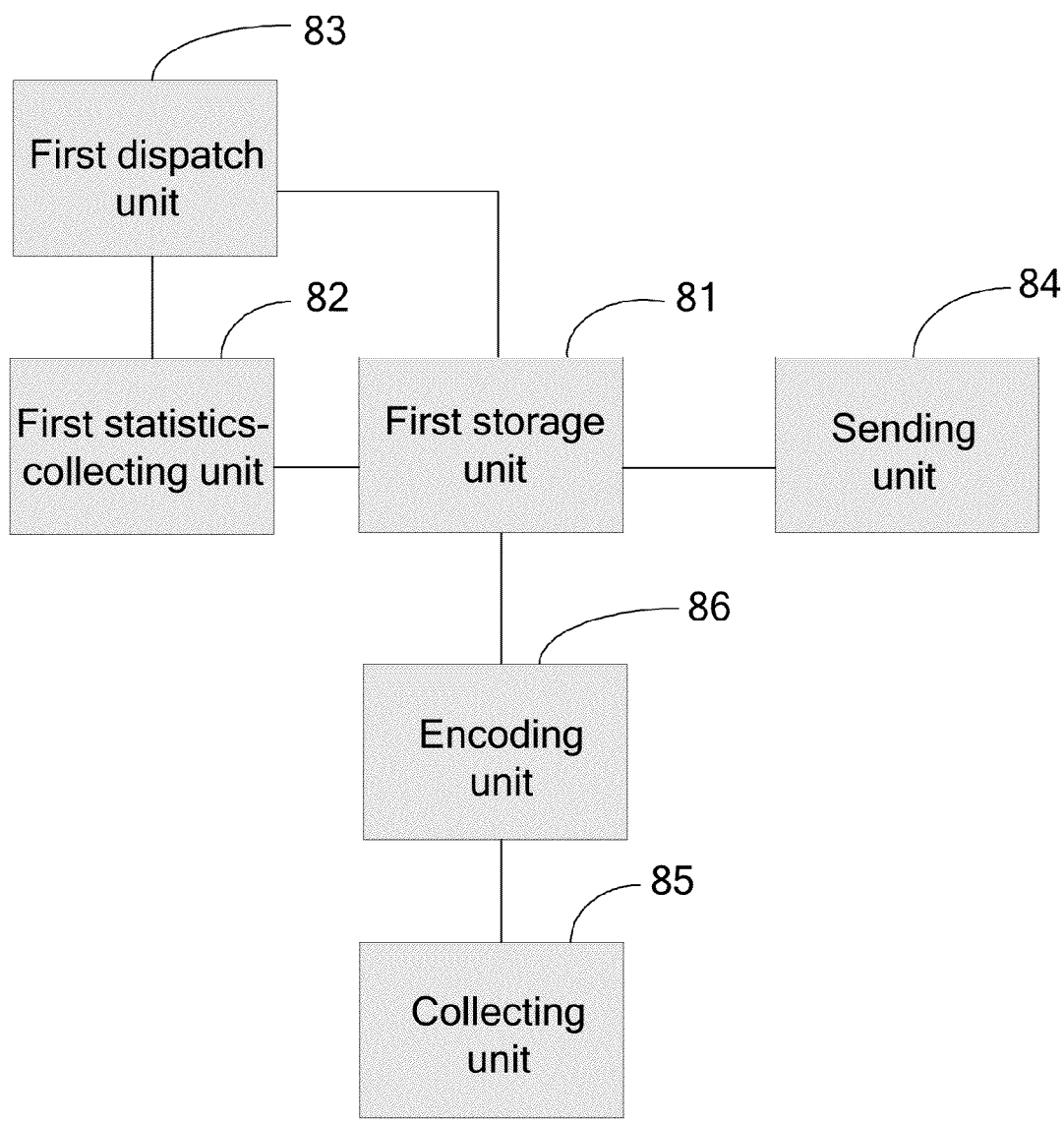
FIG. 9 shows a structure of another streaming service device provided in an embodiment 4 of the present invention.

As shown in FIG. 9, if the streaming data is collected in real time and sent to the client, the device also includes:
a collecting unit 85, adapted to collect the streaming data to be sent; and
an encoding unit 86, adapted to: encode the media data collected by the collecting unit 85 in the predefined format to acquire compressed streaming data, and send the compressed streaming data to the first storage unit 81.

The collecting unit 85 and encoding unit 86 in an embodiment of the present invention send the compressed code streams to the first storage unit 81 at the fixed beat s, and then the sending unit 84 sends data to the playing terminal. Because the network conditions are unsteady, the first dispatching unit 83 is also set in an embodiment of the present invention. The first dispatching unit 83 controls the data in the first storage unit 81.

If the network conditions are good and network transmission is not blocked, the sending beat must be greater than s, so that the least possible data or no data is kept in the first storage unit 81.

If the network condition is bad and network transmission is blocked, resulting in that the sending beat is less than s, the data is accumulated in the first storage unit 81; when the network conditions are good and the sending beat is greater than s, the accumulated data is sent quickly.

If the network condition is bad and not recovered for a long time, only critical data is sent and non-critical data is discarded after the data accumulated in the first storage unit 81 exceeds the waterline T1.

Furthermore, if the network condition is bad continuously, resulting in the data in the storage unit exceeds the high waterline T2, all the data needs to be discarded. After the network condition is recovered, critical data can be sent continuously after the critical data is received. Therefore, the first dispatching unit 83 is also adapted to discard all the data in the buffer in the first storage unit 81 when the amount of data whose statistics are collected by the first statistics-collecting unit 82 exceeds the second waterline T2, which is greater than T1.

With the media service device provided in an embodiment of the present invention, the server can send the streaming data as soon as possible when the network conditions are good without buffering the data, and the server needs to buffer the data when the network condition is bad. In this case, the buffer capacity required by the server can be reduced, and the impact of network jitter on the server receiving data is reduced.

Embodiment 5

Streaming Play Device

Figure 10:
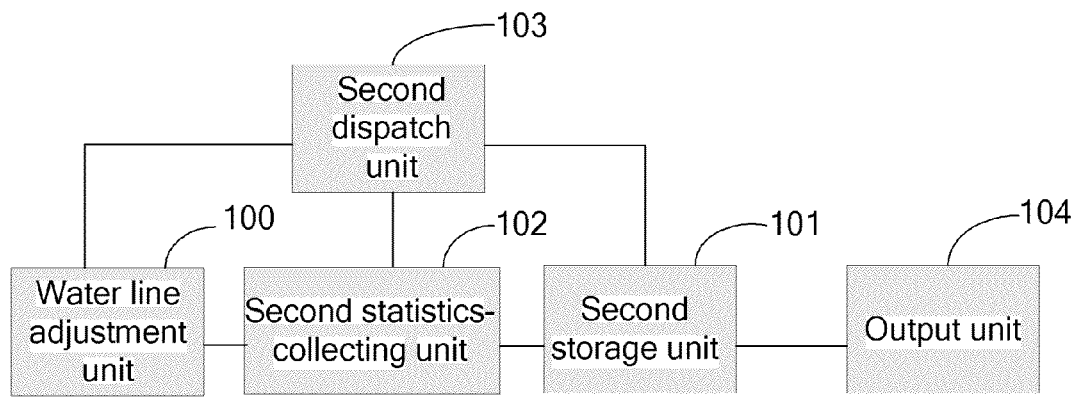
FIG. 10 shows a structure of a streaming play device provided in an embodiment 5 of the present invention.

As shown in FIG. 10, the device includes:
a second storage unit 101, adapted to buffer the streaming data from the server;
an output unit 104, adapted to export the streaming data according to the predefined rhythm;
a second statistics-collecting unit 102, adapted to collect the statistics about the amount of streaming data that is stored by the second storage unit 101; and a second dispatching unit 103, adapted to adjust the playing rhythm of the output unit 104 according to the amount of streaming data whose statistics are collected by the second statistics-collecting unit 102.

Specially, the second dispatching unit 103 is adapted to speed up the streaming play tempo when the amount of stored streaming data whose statistics are collected by the second statistics-collecting unit 102 exceeds the third waterline T3; or adapted to slow down the playing rhythm when the amount of buffered streaming data whose statistics are collected by the second statistics-collecting unit 102 is less than the third waterline T3.

Furthermore, the second dispatching unit 103 is also adapted to adjust the playing rhythm coarsely when the amount of streaming data whose statistics are collected by the second statistics-collecting unit 102 exceeds the fourth waterline T4, which is greater than T3. For the specific adjustment method, refer to the relevant embodiment. The second dispatching unit 103 is also adapted to clear the remaining data that is stored currently by the second storage unit 101 when the amount of streaming data whose statistics are collected by the second statistics-collecting unit 102 exceeds the fifth waterline T5 for many times that is greater than the predefined times.

The streaming play device also includes a waterline adjustment unit 100, adapted to adjust the value of T3 according to the amount of streaming data whose statistics are collected by the second statistics-collecting unit 102. Specially, when the amount of streaming data n is less than TL in the period for playing N1 frames continuously for the times which is greater than N times, the value of T3 is raised; if the amount of streaming data n is always greater than one frame in the period for playing N2 frames continuously, the value of T3 is lowered.

If the streaming media is the compressed code stream, the decoding operation needs to be performed before playing output, and correspondingly the rhythm can be adjusted before or after decoding data.

Figure 11:
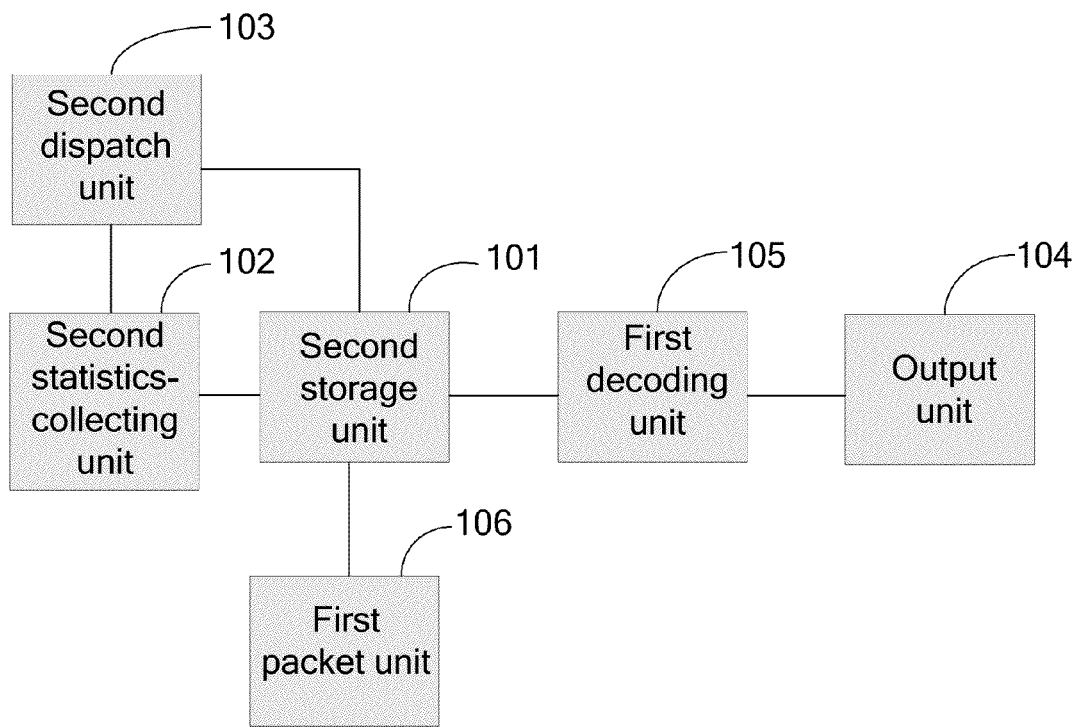
FIG. 11 shows a structure of another streaming play device provided in an embodiment 5 of the present invention.

If the rhythm is adjusted before decoding data, as shown in FIG. 11, the second storage unit 101 receives the compressed streaming data that is transmitted by the server. The device also includes the first decoding unit 105, which is adapted to decode the streaming data that is stored by the second storage unit 101 according to the rhythm that is determined by the second dispatching unit 103, and send the data to the output unit 104. The streaming data that is stored by the second storage unit 101 is dispatched before decoding data to reduce storage overhead greatly.

Because the amount of code stream from the network may be not fixed, the playing terminal needs to package the code stream after receiving the network packet of the code stream to control the rhythm. For the video data, the network stream data needs to be packaged in frames; for the audio data, the network stream data needs to be packaged with the fixed length of 10 ms, 20 ms, or 40 ms. The device also includes a first packaging unit 106 that is adapted to package a streaming packet sent by the server in frames or into a fixed-length packet, and then send the packet to the second storage unit 101 for storage.

Figure 12:
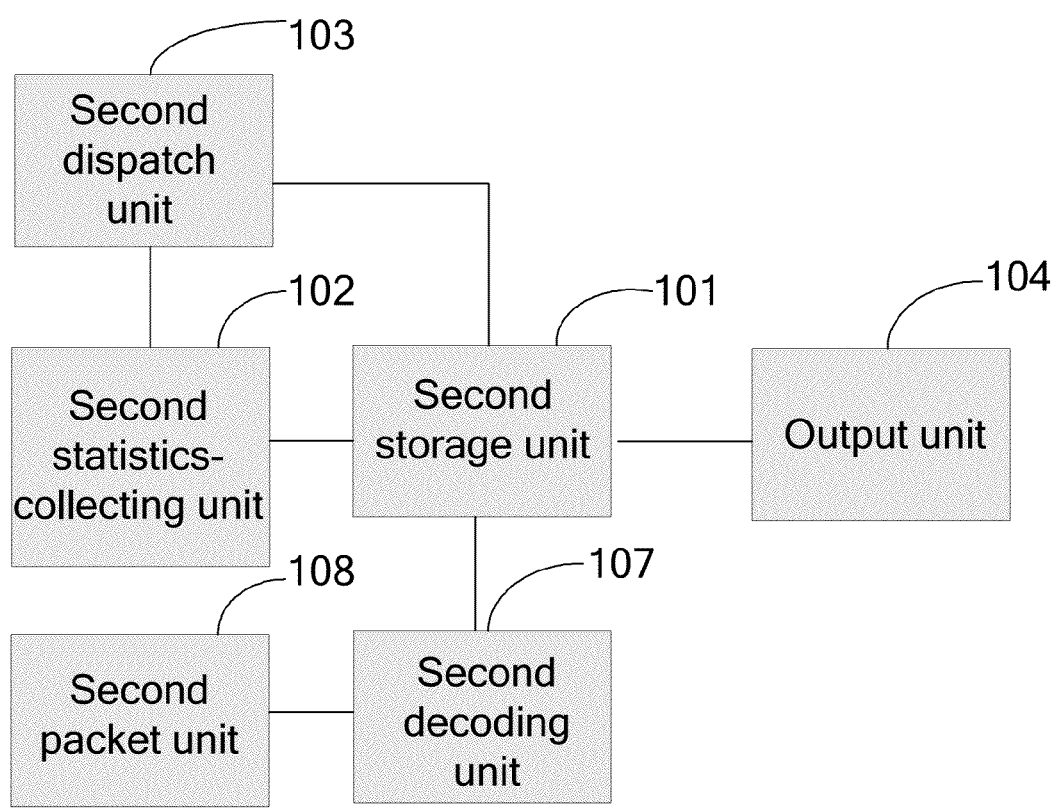
FIG. 12 shows a structure of another streaming service device provided in an embodiment 5 of the present invention.

If the rhythm is adjusted after decoding data, as shown in FIG. 12, the device includes a second decoding unit 107 that is adapted to decode the streaming data when receiving the streaming data from the server, and send the data to the second storage unit 101 for storage. The device also includes a second packaging unit 108 that is adapted to package a streaming packet sent by the server in frames or into a fixed-length packet, and then send the packet to the second decoding unit 107 for decoding.

With the device for playing the streaming data provided an embodiment of the present invention, the playing delay can be minimized to about 250 ms in the LAN. The waterline value can be adjusted to balance the relationship between delay and play quality. On the basis of ensured short delay, images can be output smoothly, and the waterline can be adjusted according to different network conditions and bandwidth to meet various user demands. In addition, the client can achieve the smooth control of the rhythm easily in real time. In a mode of adjusting the waterlines, the rhythm can be adjusted coarsely in the case of abnormality, so that the streaming data is restored to the normal state.

Embodiment 6

Streaming On-Demand System

Figure 13:
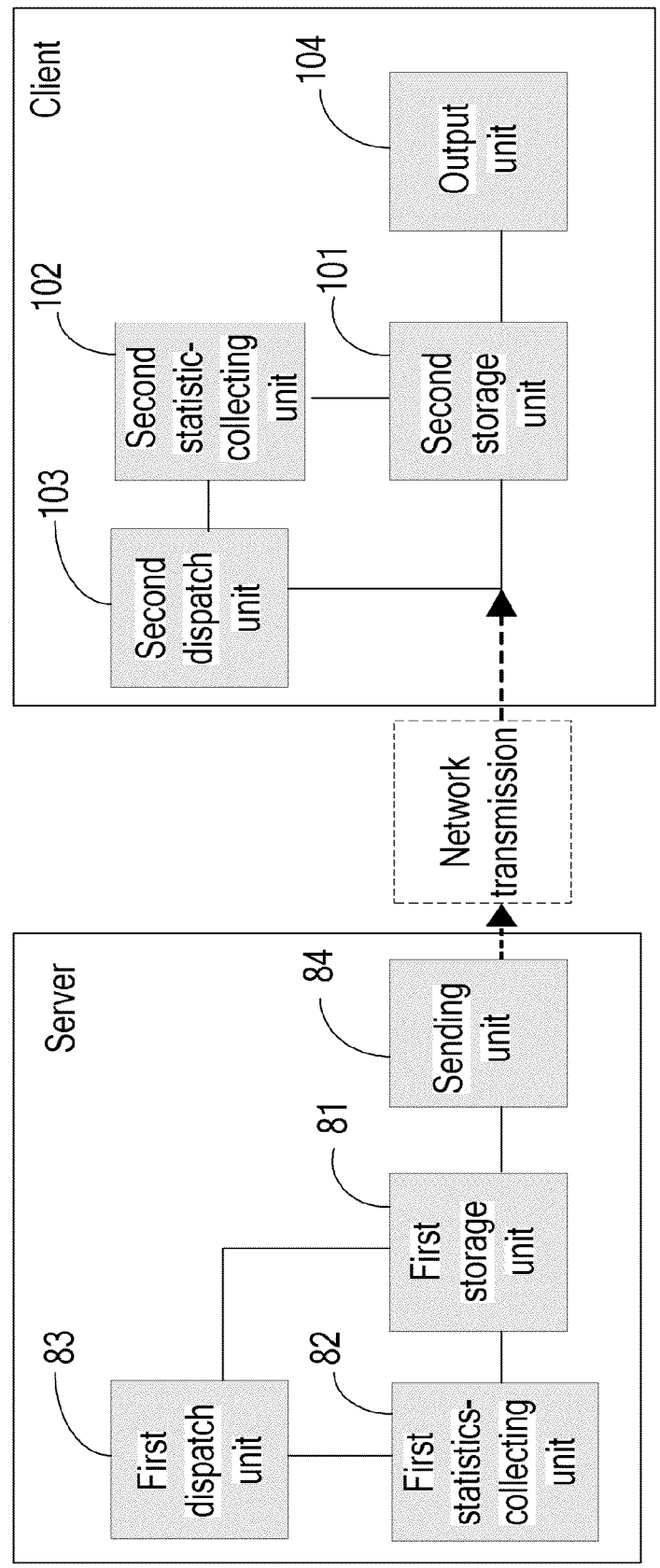
FIG. 13 shows a schematic diagram of a stream on-demand system provided in an embodiment 6 of the present invention.

A streaming service device and a device for playing the streaming data provided in an embodiment of the present invention can be used to build a streaming on-demand system. The following section describes an embodiment. For other embodiments, see the relevant description in the preceding sections. As shown in FIG. 13, the system includes:

a first storage unit 81, adapted to acquire the streaming data to be sent and store the data;

a first statistics-collecting unit 82, adapted to collect the statistics about the amount of streaming data that is stored by the first storage unit 81;

a first dispatching unit 83, adapted to discard the non-critical data of the streaming data that is stored by the first storage unit 81 when the amount of streaming data whose statistics-collecting are collected by the first statistics-collecting unit 82 exceeds the first waterline T1;

a sending unit 84, adapted to send the streaming data that is stored by the first storage unit 81 to the client according to the predefined sending beat;

a second storage unit 101, adapted to buffer the streaming data from the server;

an output unit 104, adapted to export the streaming data according to the predefined rhythm;

a second statistics-collecting unit 102, adapted to collect the statistics about the amount of streaming data that is stored by the second storage unit 101; and a second dispatching unit 103, adapted to adjust the rhythm of the output unit 104 according to the amount of streaming data whose statistics are collected by the second statistics-collecting unit 102.

The server can send the streaming data as soon as possible when the network conditions are good without buffering the data, and the server needs to buffer the data when the network condition is bad. In this case, the buffer capacity required by the server can be reduced, and the impact of network jitter on the server receiving data is reduced. At the client, the playing delay can be minimized In addition, the client can achieve the smooth control of the rhythm easily in real time.

The forgoing sections describe only several embodiments in the present invention. Those skilled in the art can make modifications and variations in the present invention based on the application document without departing from the scope of the present invention.

What is claimed is:

1. A method for playing streaming data, comprising:
receiving the streaming data from a server and storing the streaming data in a buffer;
obtaining an amount of the streaming data in the buffer;
adjusting playing rhythm according to the amount of the streaming data stored in the buffer, wherein the adjusting process further comprises:
speeding up the playing rhythm if the amount of streaming data in the buffer exceeds a third waterline T3, and
slowing down the playing rhythm if the amount of the streaming data stored in the buffer is less than the third waterline T3,
wherein the adjustment for the playing rhythm is implemented by adjusting playing beat of the streaming data, wherein n represents the number of streaming data frames in the buffer, y represents time interval between adjacent frames that are exported after playing the adjustment, and s' represents receiving beat of the streaming data that is sent by the server,
if n=T3, y=1/s';
if n>T3, y<1/s';
if n<T3, y>1/s'.

2. The method according to claim 1, wherein the adjustment for the playing rhythm is implemented by adjusting playing beat of the streaming data, and the playing beat is adjusted according to a formula of:

$$y = \begin{cases} 1.6x, & n \geq T3-3 \\ 1.4x, & n = T3-2 \\ 1.2x, & n = T3-1 \\ x, & n = T3 \\ 0.8x, & n = T3+1 \\ 0.6x, & n = T3+2 \\ 0.4x, & n = T3+3 \\ 0.2x, & n = T3+4 \\ 5, & \text{others} \end{cases}$$

wherein, x represents the time interval between adjacent frames when the streaming data is stored into the buffer, and y represents time interval between adjacent frames when the streaming data is played.

3. The method according to claim 1, wherein the method further comprises:
adjusting the third waterline T3 according to the amount of the streaming data stored in the buffer.

4. The method according to claim 3, wherein the step of adjusting the third waterline T3 according to the amount of the streaming data stored in the buffer further comprises:
adjusting the waterline T3 upwards if the amount of the streaming data stored in the buffer reaches a predefined bottom line of preconfigured times in a certain period;
adjusting the waterline T3 downwards if the amount of the streaming data stored in the buffer exceed a predefined top line of preconfigured times in another certain period.

5. The method according to claim 1, wherein the method further comprises:
discarding the streaming data in most of frames in the buffer, or discarding all the streaming data in the buffer, when the streaming data in the buffer exceeds a forth waterline T4 and the forth waterline T4 is higher than the third waterline T3.

6. The method according to claim 1, wherein the method further comprises:
discarding all the streaming data in most of frames in the buffer, when the amount of the streaming data in the buffer exceeds a fifth waterline T5 continuously for a predefined times and the fifth waterline T5 is smaller than the third waterline T3.

7. A streaming service device, comprising:
a first storage unit, configured to acquire streaming data to be sent and store the streaming data;
a first statistics-collecting unit, configured to collect statistics on the amount of the streaming data that is stored in the first storage unit;
a first dispatching unit, configured to discard the non-critical data of the streaming data stored in a first storage unit when the amount of streaming data stored in the first statistics-collecting unit exceeds a first waterline T1, wherein the first dispatching unit is further configured to discard all the streaming data stored in the first storage unit when the amount of the streaming data stored in the first storage unit exceeds a second waterline T2;
a sending unit, configured to send the streaming data.

8. A streaming play device, comprising:
a second storage unit, configured to buffer streaming data from a server;
an output unit, configured to export the streaming data for playing;
a second statistics-collecting unit, configured to collect statistics about an amount of the streaming data stored in the second storage unit;
a second dispatching unit, configured to adjust playing rhythm of the output unit according to the amount of streaming data, wherein the second dispatching unit speeds up the playing rhythm when the amount of the streaming in the second storage unit exceeds a third waterline T3, and slow down the playing rhythm when the streaming data stored in the storage unit is less than the third waterline T3,
wherein the adjustment for the playing rhythm is implemented by adjusting playing beat of the streaming data, wherein n represents the number of streaming data frames in the buffer, y represents time interval between adjacent frames that are exported after playing the adjustment, and s' represents receiving beat of the streaming data that is sent by the server,
if n=T3, y=1/s';
if n>T3, y<1/s';
if n<T3, y>1/s'.

9. The streaming device according to claim 8, wherein the second dispatching unit is further configured to discard part of the streaming data in the second storage unit when the streaming data in the second storage unit exceeds a forth waterline T4 and forth waterline T4 is higher than the third waterline T3.

10. The streaming device according to claim 8, wherein the second dispatching unit is further configured to discard all the streaming data in the second storage unit when the streaming data in the second storage unit exceeds a fifth waterline T5.

11. The streaming device according to claim 8, wherein the streaming play device further comprises a waterline adjustment unit, configured to adjust the waterlines defined according to the amount of the streaming data in the second storage unit.

12. The streaming device according to claim 11, wherein the streaming data also comprises: a first decoding unit, configured to decode the streaming data in the second storage unit according to the playing rhythm that is determined by the second dispatching unit.

* * * * *

UNITED STATES PATENT AND TRADEMARK OFFICE
CERTIFICATE OF CORRECTION

PATENT NO. : 8,412,364 B2
APPLICATION NO. : 12/642733
DATED : April 2, 2013
INVENTOR(S) : Li et al.

Page 1 of 1

It is certified that error appears in the above-identified patent and that said Letters Patent is hereby corrected as shown below:

In the Claims

Column 11, line 60, "forth" should read -- fourth --.

Column 11, line 61, "forth" should read -- fourth --.

Column 12, line 48, "forth" should read -- fourth --.

Column 12, line 49, "forth" should read -- fourth --.

Signed and Sealed this
Fourth Day of June, 2013

Teresa Stanek Rea
*Acting Director of the United States Patent and Trademark Office*